United States Patent
Chun et al.

(10) Patent No.: US 10,221,102 B2
(45) Date of Patent: Mar. 5, 2019

(54) SIALON COMPOSITE AND CUTTING TOOLS MADE THEREOF

(71) Applicant: TaeguTec, Ltd., Dalseong-gun, Daegu (KR)

(72) Inventors: Sung Su Chun, Daegu (KR); Dae Yeop Lee, Daegu (KR); Geun Ho Park, Daegu (KR); Chang Hoon Hong, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 0 days.

(21) Appl. No.: 15/567,262

(22) PCT Filed: Apr. 22, 2016

(86) PCT No.: PCT/KR2016/004191
§ 371 (c)(1),
(2) Date: Oct. 17, 2017

(87) PCT Pub. No.: WO2016/171502
PCT Pub. Date: Oct. 27, 2016

(65) Prior Publication Data
US 2018/0134627 A1    May 17, 2018

(30) Foreign Application Priority Data

Apr. 24, 2015    (KR) .................... 10-2015-0057819

(51) Int. Cl.
*C04B 35/599*    (2006.01)
*B23C 5/00*    (2006.01)
(Continued)

(52) U.S. Cl.
CPC .............. *C04B 35/597* (2013.01); *B23C 5/00* (2013.01); *C04B 35/6261* (2013.01);
(Continued)

(58) Field of Classification Search
CPC ................................ C04B 35/597; B23C 5/00
See application file for complete search history.

(56) References Cited

U.S. PATENT DOCUMENTS

| 5,411,923 A | 5/1995 | Suzuki |
| 2004/0102305 A1 | 5/2004 | Yeckley |

(Continued)

FOREIGN PATENT DOCUMENTS

| JP | 2005-231928 A | 9/2005 |
| JP | 2005231928 A * | 9/2005 |

(Continued)

OTHER PUBLICATIONS

International Search Report dated Sep. 12, 2016 issued in counterpart International (PCT) Application (No. PCT/KR2016/004191).
(Continued)

*Primary Examiner* — Karl E Group
(74) *Attorney, Agent, or Firm* — Womble Bond Dickinson (US) LLP

(57) ABSTRACT

A SiAlON composite includes a SiAlON phase including α-SiAlON phase, β-SiAlON phase and grain boundary phase. The SiAlON composite is prepared from a starting powder mixture including a silicon nitride powder and at least one powder providing aluminum, oxygen, nitrogen, yttrium (Y) and erbium (Er) to the SiAlON composite. The SiAlON composite contains the SiAlON phase of at least 90 vol %, z-value of the β-SiAlON phase ranges between 0.27 and 0.36 and thermal diffusivity of the SiAlON composite is equal to or greater than 2.4 (mm$^2$/sec) and equal to or less than 5.2 (mm$^2$/sec).

15 Claims, 1 Drawing Sheet

(51) Int. Cl.
    *C04B 35/597* (2006.01)
    *C04B 35/626* (2006.01)
    *C04B 35/645* (2006.01)
    *C09K 5/14* (2006.01)

(52) U.S. Cl.
    CPC .... *C04B 35/6264* (2013.01); *C04B 35/62655* (2013.01); *C04B 35/645* (2013.01); *C09K 5/14* (2013.01); *B23C 2200/36* (2013.01); *B23C 2224/04* (2013.01); *C04B 2235/3217* (2013.01); *C04B 2235/3224* (2013.01); *C04B 2235/3225* (2013.01); *C04B 2235/3869* (2013.01); *C04B 2235/3873* (2013.01); *C04B 2235/606* (2013.01); *C04B 2235/6567* (2013.01); *C04B 2235/766* (2013.01); *C04B 2235/767* (2013.01); *C04B 2235/80* (2013.01); *C04B 2235/85* (2013.01); *C04B 2235/87* (2013.01); *C04B 2235/96* (2013.01); *C04B 2235/9607* (2013.01)

(56) References Cited

U.S. PATENT DOCUMENTS

2008/0119349 A1* 5/2008 Abukawa .............. B23B 27/141 501/98.2
2013/0298474 A1* 11/2013 Osthols ................. B23B 27/148 51/307

FOREIGN PATENT DOCUMENTS

JP    2012-5031541 B2    9/2012
JP    2018015793 A    *    2/2018

OTHER PUBLICATIONS

Written Opinion dated Sep. 12, 2016 issued in counterpart International (PCT) Application (No. PCT/KR2016/004191).

Jung et al., "Low pressure sintering of sialon using different sintering additives," Ceramic Society of Japan, Journal, vol. 116, No. 1349, Jan. 1, 2008, pp. 130-136, XP055520100.

Ruiz et al., "Use of Rare Earth Concentrate as a SiAION Sintering Additive," Advanced Powder Technology: Proceedings of the First International Latin-American Conference on Powder Technology, Nov. 1997, vol. 299-300, Dec. 1, 1998, pp. 141-148, XP009509071.

Santos et al., "Stabilization of α-SiAIONs using a rare-earth mixed oxide ($RE_2O_3$) as sintering additive," Materials Research Bulletin, vol. 40, No. 7, Jul. 12, 2005, pp. 1094-1103, XP027715063, ISSN: 0025-5408.

Extended European Search Report dated Nov. 12, 2018, issued in counterpart European application (No. EP 16783434.0).

* cited by examiner

[Fig. 1]
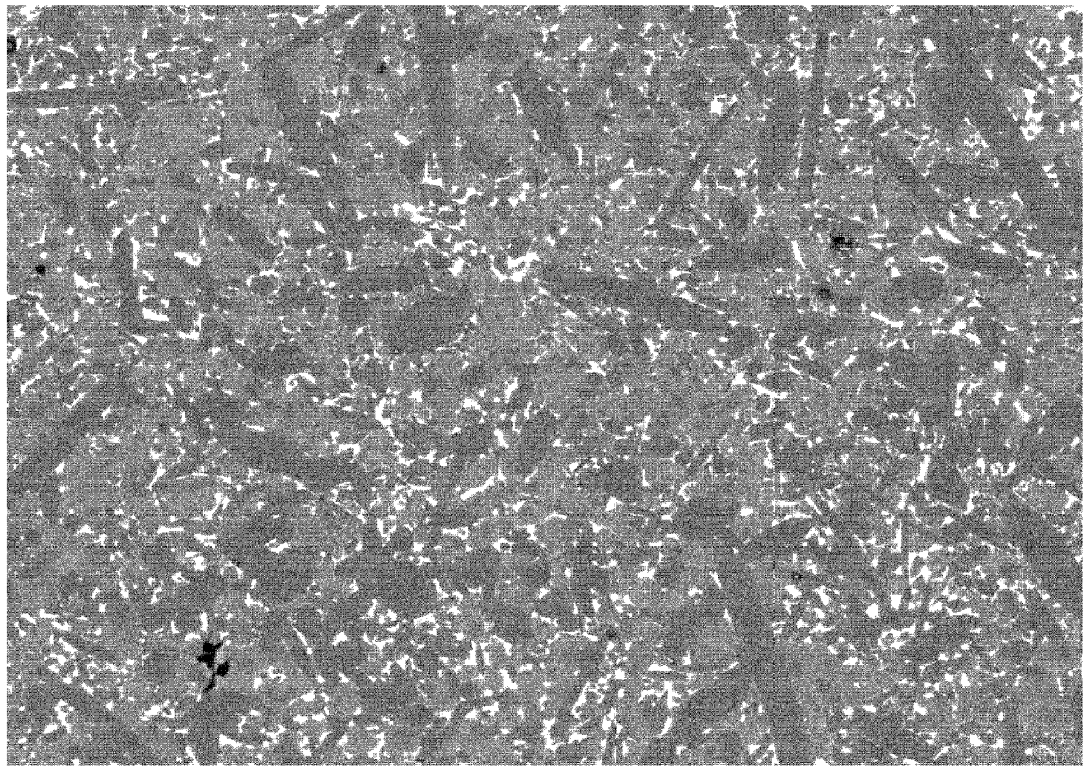
[Fig. 2]
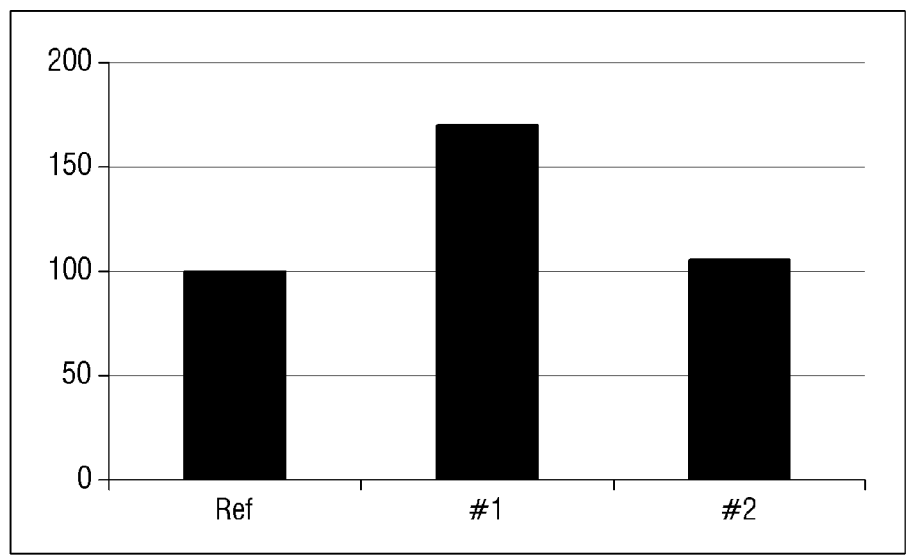

SIALON COMPOSITE AND CUTTING TOOLS MADE THEREOF

RELATED APPLICATIONS

This is a 35 USC 371 U.S. National Phase of International Application No. PCT/KR2016/004191, filed 22 Apr. 2016 and published as WO 2016/171502A1 on Oct. 27, 2015, which claims priority to Korean application no. 10-2015-0057819 filed Apr. 24, 2015. The contents of the aforementioned applications are incorporated by reference in their entirety.

TECHNICAL FIELD

The present disclosure relates to a SiAlON composite having suitable wear resistance and fracture toughness for machining of heat resistant super alloys (HRSA) and cutting tools made thereof.

BACKGROUND ART

Ceramic materials having high hot hardness for cutting tools are suitable for machining of metals having high hardness, high tensile strength and low thermal diffusivity at high temperature, and particularly suitable for machining self-hardening materials such as nickel- or cobalt-based heat resistant super alloys (HRSA).

Many silicon nitride-based materials for cutting tools are produced using aluminum oxide ($Al_2O_3$) as a sintering aid. Aluminum and oxygen can replace silicon and nitrogen, respectively, in the crystal structure of silicon nitride, thereby forming a SiAlON ceramic. The SiAlON ceramic consists of Si—Al—O—N and can be often additionally stabilized by a cation $Me^{n+}$ wherein Me is selected from a large number of rare-earth metals and lanthanides with suitable ionic radius (r<1.0 Å), such as Yb, Dy, Lu, Li, Ca, Mg, or Sc.

Many SiAlON phases have been detected and characterized, as disclosed in Izhevskiy V A, Genova L A, Bressiani J C and Aldinger F., "Progress in SiAlON ceramics", *J. Eur. Ceram. Soc.* 20, 2275~2295 (2000), but predominant phases for cutting tool materials remain an α-SiAlON phase, $R_xSi_{12-(m+n)}Al_{(m+n)}O_nN_{(16-n)}$, wherein m is greater than 1.0 and less than 2.7, n is less than 1.2 and R is selected from the aforementioned metals and lanthanides having an ionic radius less than 1.0 Å, and β-SiAlON, $Si_{6-z}Al_zO_zN_{(8-z)}$ wherein z is greater than 0 and less than 4.2.

In addition to stabilizing the α-SiAlON phase, the metal ions may act as catalysts for creating SiAlON crystals upon sintering. The metal ion facilitates formation of elongated SiAlON particles, usually in the β phase, but elongated particles of α-SiAlON are also formed (see Fang-Fang X, Shu-Lin W, Nordberg L-O and Ekstreom T, "Nucleation and Growth of the Elongated α'-SiAlON", *J. Eur. Ceram. Soc.* 17(13) 1631-1638 (1997))

SiAlON materials may include an α-SiAlON phase and a β-SiAlON phase, and may further contain silicon carbide particles dispersed throughout the SiAlON matrix (see U.S. Pat. No. 4,829,791).

U.S. Pat. No. 5,370,716 to Mehrotra et al. discloses a SiAlON material comprising a β-SiAlON phase having a high z value. The β-SiAlON phase has a structure of $Si_{6-z}Al_zO_zN_{(8-z)}$ wherein z is greater than 1 and less than 3.

U.S. Pat. No. 6,124,225 to Tien et al. discloses a SiAlON ceramic material having a high proportion of α-SiAlON. Tien et al. lists Nd, Sm, Gd, Dy, Yb and Y and mixtures thereof, as additives, and Gd as a preferred additive. In a preferred embodiment, a starting silicon nitride powder contains about 95% by weight of α-silicon nitride. The '225 patent to Tien et al. does not appear to be directed to a SiAlON ceramic produced from a starting powder mixture comprising a starting silicon nitride powder which contains either no or a small amount (that is, an amount having a lower limit of 0% by weight and an upper limit of about 1.6% by weight) of β-silicon nitride.

α-SiAlON can be formed using additives, as disclosed in an article of Nordberg et al. entitled "Stability and Oxidation Properties of RE-α-Sialon Ceramics (RE=Y, Nd, Sm, Yb)" (*J American Ceramic Society* 81 [6] pp. 1461-70 (1998)). In an embodiment, only one kind of rare-earth element (for example, Nd, Sm, or Yb) is used. The article disclosed SNE-10 (UBE) as the starting silicon nitride powder. That is, the article does not appear to address a SiAlON ceramic produced from a starting powder mixture comprising a starting silicon nitride powder which contains either no or a small amount (that is, an amount having a lower limit of 0% by weight and an upper limit of about 1.6% by weight) of β-silicon nitride.

It is preferable to provide an improved SiAlON material for cutting tool application which exhibits improved metal cutting performance properties including hardness, Young's Modulus, fracture toughness, thermal conductivity and thermal shock resistance, although current ceramic cutting tools exhibit properties (for example, hardness and fracture toughness) suitable for use as cutting tools. The same is applied to SiAlON wear components in that it is preferable to provide an improved SiAlON material for wear resistance application which exhibits improved performance although current SiAlON wear components exhibit satisfactory properties (for example, hardness and fracture toughness).

In this regard, when the powder mixtures are sintered to produce the SiAlON material, crystalline phases can be formed in the grain boundaries between α-SiAlON grains and β-SiAlON grains. An increase in content of crystalline phases in the grain boundaries can cause a decrease in fracture toughness of the SiAlON material. Thus, it is preferable to provide a SiAlON material which has a minimal amount of grain boundaries and crystalline phases formed therein.

A SiAlON ceramic material having a high hardness is advantageous for use in certain applications such as a cutting insert and a wear part. Generally, a SiAlON ceramic material having a finer grain size shows a higher hardness. Accordingly, it is preferable to provide a SiAlON ceramic material which has a finer grain size and thus a higher hardness.

PRIOR ART DOCUMENT

U.S. Pat. No. 4,829,791

DISCLOSURE OF INVENTION

Technical Problem

The present disclosure provides a SiAlON composite for metal cutting tools having suitable thermal conductivity and thermal diffusivity for machining of heat resistant alloys.

The present disclosure also provides cutting tools made of a SiAlON composite for metal cutting tools having suitable thermal conductivity and thermal diffusivity for machining of heat resistant alloys.

However, aspects of the present disclosure are not restricted to those set forth herein. The above and other aspects of the present disclosure will become more apparent to one of ordinary skill in the art to which the present disclosure pertains by referencing the detailed description given below.

Solution to Problem

According to an embodiment of the present disclosure, there is provided a SiAlON composite comprising a SiAlON phase including an α-SiAlON phase, a β-SiAlON phase and a grain boundary phase, wherein the SiAlON composite is prepared from a starting powder mixture including a silicon nitride powder and at least one powder providing aluminum, oxygen, nitrogen, yttrium (Y) and erbium (Er) to the SiAlON composite, wherein the SiAlON composite contains the SiAlON phase of at least 90 vol %, wherein z-value of the β-SiAlON phase is a value between 0.27 and 0.36, and wherein a thermal diffusivity of the SiAlON composite is equal to or greater than 2.4 (mm$^2$/sec) and equal to or less than 5.2 (mm$^2$/sec).

In the SiAlON composite according to the embodiment of the present disclosure, a thermal conductivity of the SiAlON composite may be equal to or greater than 8.2 (W/(m·K)) and equal to or less than 11.4 (W/(m·K)).

In the SiAlON composite according to the embodiment of the present disclosure, a thermal expansion coefficient of the SiAlON composite may be equal to or greater than 3.4 ($10^{-6}$/K) and equal to or less than 4.0 ($10^{-6}$/K).

In the SiAlON composite according to the embodiment of the present disclosure, a ratio of the α-SiAlON phase to the SiAlON phase may be equal to or greater than 21.75% and equal to or less than 48.5%.

In the SiAlON composite according to the embodiment of the present disclosure, the starting powder mixture may include alumina ($Al_2O_3$), yttria ($Y_2O_3$) and erbia ($Er_2O_3$), and the sum of contents of the alumina, the yttria and the erbia may range from 8.87 wt % to 11.83 wt %.

In the SiAlON composite according to the embodiment of the present disclosure, the sum of contents of the yttria and the erbia may range from 6.08 wt % to 9.12 wt %.

In the SiAlON composite according to the embodiment of the present disclosure, a Vickers hardness of the SiAlON composite may be between 16.6 and 18.7 GPa at room temperature, and a fracture toughness of the SiAlON composite may be between 4.1 and 5.4 MPam$^{0.5}$.

The SiAlON composite according to the embodiment of the present disclosure has suitable thermal conductivity and thermal diffusivity which can be used for cutting tool insert for machining heat resistant alloys.

Advantageous Effects of Invention

According to exemplary embodiments of the present disclosure, a SiAlON composite is provided, which has suitable thermal conductivity and thermal diffusivity for machining of heat resistant super alloys (HRSA).

BRIEF DESCRIPTION OF DRAWINGS

The above and other aspects and features of the present disclosure will become more apparent by describing in detail exemplary embodiments thereof with reference to the attached drawings, in which:

FIG. 1 is a scanning electron microscope image showing a microstructure of a SiAlON composite according to an embodiment of the present disclosure; and FIG. 2 shows the milling test results of cutting tools according to the embodiment of the present disclosure.

MODE FOR THE INVENTION

A SiAlON composite according to embodiments of the present disclosure may be prepared by using a $Si_3N_4$ powder and at least one powder providing aluminum, oxygen, nitrogen, yttrium (Y) and erbium (Er).

The aluminum provided to the SiAlON composite may be provided from an AlN powder and an alumina ($Al_2O_3$) powder. The yttrium provided to the SiAlON composite may be provided from a yttria ($Y_2O_3$) powder. The erbium provided to the SiAlON composite may be provided from an erbia ($Er_2O_3$) powder. Further, the oxygen provided to the SiAlON composite may be provided from the $Al_2O_3$ powder, the $Y_2O_3$ powder and the $Er_2O_3$ powder.

The content of $Si_3N_4$ used to prepare the SiAlON composite may range from 83.6 wt % to 86.4 wt %, and the content of AlN used to prepare the SiAlON composite may range from 4.57 wt % to 4.73 wt %. The content of $Y_2O_3$ used to prepare the SiAlON composite may range from 2.6 wt % to 3.9 wt %, the content of $Er_2O_3$ used to prepare the SiAlON composite may range from 3.48 wt % to 5.22 wt %, and the content of $Al_2O_3$ used to prepare the SiAlON composite may range from 2.71 wt % to 2.79 wt %.

The sum of the contents of $Y_2O_3$, $Er_2O_3$ and $Al_2O_3$ used to prepare the SiAlON composite may range from 8.87 wt % to 11.83 wt %. Further, the sum of the contents of $Y_2O_3$ and $Er_2O_3$ which include metal ions that can be used as a catalyst to prepare the SiAlON composite may range from 6.08 wt % to 9.12 wt %.

After adding methanol as a solvent, a dispersing agent and a binder to a powder mixture in which the powders are mixed in the above-described ranges, it is mixed and ground by a ball milling for about 20 hours. A slurry containing raw materials is prepared by grinding the powder mixture as described above.

After grinding, the slurry is granulated by a spray dryer. The spray dried powder are sieved for forming the cutting tools.

The pressed body (green body) is debinded and then sintered by gas pressure sintering for 2 hours at a temperature of 1680° C. to 1820° C.

FIG. 1 is a scanning electron microscope image showing a microstructure of the SiAlON composite according to an embodiment of the present disclosure. For reference, FIG. 1 is obtained by measuring the polished surface of SiAlON.

The SiAlON composite may include SiAlON phases containing an α-SiAlON phase and a β-SiAlON phase. Further, the SiAlON composite may further include a grain boundary crystalline phase.

In FIG. 1, the SiAlON composite according to the embodiment of the present disclosure may include a SiAlON phase of at least 90 vol %. That is, the SiAlON composite according to the embodiment of the present disclosure can improve the fracture toughness of the SiAlON composite by reducing the content of the grain boundary crystalline phase to 10 vol % or less.

The analysis of the SiAlON composite obtained by X-ray diffraction analysis is represented in Table 1.

TABLE 1

Substitution rate of β-SiAlON

| No of measurement | z value of β-SiAlON(substitution rate) | | | | |
|---|---|---|---|---|---|
| | a | c | Za | Zc | Zc/a |
| 1 | 7.6133 | 2.9153 | 0.2970 | 0.2889 | 0.3309 |
| 2 | 7.6127 | 2.9151 | 0.2770 | 0.2815 | 0.3329 |
| 3 | 7.6151 | 2.9163 | 0.3570 | 0.3259 | 0.3513 |
| 4 | 7.6133 | 2.9154 | 0.2973 | 0.2930 | 0.3379 |
| 5 | 7.6136 | 2.9157 | 0.3070 | 0.3041 | 0.3503 |

Referring to Table 1, in the SiAlON composite according to the embodiment of the present disclosure, z-value of β-SiAlON which can be represented by the formula: $Si_{(6-z)}Al_zO_zN_{(8-z)}$ may be ranged between 0.27 and 0.36.

In the SiAlON composite, the z value of β-SiAlON may affect the hardness, fracture toughness, and grain size distribution (see Ekstrom et al., "SiAlON ceramics", J. AM. Ceram. Soc. 75 (2), 259-276 (1992)). Further, the z-value of β-SiAlON may affect the cutting performance of the cutting tools made of the SiAlON composite. Generally, the low z-value of β-SiAlON means high fracture toughness and high notch wear resistance.

Thus, by lowering the z value of β-SiAlON, it is possible to improve the fracture toughness and notch wear resistance of the SiAlON composite.

Further, in the SiAlON composite according to the embodiment of the present disclosure, each of m and n values of α-SiAlON which can be represented by the formula: $R_xSi_{12(m+n)}Al_{(m+n)}O_nN_{(16-n)}$ may be a value between 0.1 and 1.

In addition, the content of the α-SiAlON phase in the SiAlON composite is analyzed by X-ray diffraction analysis of the SiAlON composite.

The content of the α-SiAlON phase in the SiAlON composite can be obtained by using the following formula.

First, the diffraction intensity $I_1$ of the α-SiAlON phase may be defined as the sum of the diffraction intensity on the (102) plane of α-SiAlON and the diffraction intensity on the (210) plane of α-SiAlON.

Further, the diffraction intensity $I_2$ of the β-SiAlON phase may be defined as the sum of the diffraction intensity on the (101) plane of β-SiAlON and the diffraction intensity on the (210) plane of β-SiAlON.

In this case, the content of the α-SiAlON phase in the SiAlON composite may be a ratio of the diffraction intensity $I_1$ of the α-SiAlON phase to the sum of the diffraction intensity $I_1$ of the α-SiAlON phase and the diffraction intensity $I_2$ of the β-SiAlON phase.

In the SiAlON composite according to the embodiment of the present disclosure, the content of the α-SiAlON phase may be a value between 21.75 and 48.50%.

<Evaluation 1>

For the prepared SiAlON composite, Vickers hardness $H_v$, Rockwell hardness $H_{Ra}$, fracture toughness $K_{IC}$, 3-point and 4-point flexural strength σ, Young's Modulus E and Poisson's ratio ν were measured, and each average value or range was shown in Table 2. In Table 2, the unit of Vickers hardness $H_v$ is kgf/mm$^2$, the unit of fracture toughness $K_{IC}$ is MPa·$^{1/2}$, the unit of flexural strength σ is MPa, and the unit of Young's Modulus E is GPa.

TABLE 2

Mechanical properties

| Hv | $H_{Ra}$ | $K_{IC}$ | σ | E | ν |
|---|---|---|---|---|---|
| 1660-1870 | 94.3-95.2 | 4.13-5.40 | 1053(3 point) 900(4 point) | 321.7 | 0.2763 |

The Vickers hardness of Table 2 was obtained by measuring a diagonal line of a recess by pressing a diamond indenter of a square pendulum at a face angle of 136° with a load of 10 kg. In this case, the indentation speed of the indenter was 150 μm/s, and the indentation time was maintained for 15 seconds.

If the Vickers hardness of the SiAlON composite has, for example, a value between 1660 and 1870, the SiAlON composite may be used for cutting tools.

The Rockwell hardness $H_{Ra}$ of Table 2 is hardness defined as a difference in depth between a recess formed when a first reference load is applied by using a diamond cone indenter having a specific shape and a recess formed when a load is increased up to a test load (60 kgf in the measurement of the present disclosure), and then returned to the first reference load.

If the Rockwell hardness of the SiAlON composite has, for example, a value between 94.3 and 95.2, the SiAlON composite may be used for cutting tools.

The fracture toughness $K_{IC}$ of Table 2 was measured by using Eq. 1 shown in Equilibrium penny-like cracks in indentation fracture, J. Mat. Sci. 12: 2016-2024(1975) of Lawn B. R. and Fuller E. R.

$$K_{IC} = 0.0726 \times \frac{P}{C^{1.5}} \qquad \text{[Mathematical Equation 1]}$$

wherein P is an indentation load (10 kg) and c is a crack length.

If the fracture toughness of the SiAlON composite has, for example, a value greater than 4.1, the SiAlON composite may be used to make cutting tools.

<Evaluation 2>

The thermal conductivity, thermal diffusivity and thermal expansion coefficient for the prepared SiAlON composite were measured and average values were represented in Tables 3 to 5.

TABLE 3

Thermal conductivity(W/(m · K))

| Temperature(° C.) | 25 | 100 | 200 | 300 | 400 | 500 | 600 | 700 | 800 | 900 |
|---|---|---|---|---|---|---|---|---|---|---|
| W/(m · K) | 10.5 | 10.3 | 10.2 | 9.9 | 9.6 | 9.4 | 9.2 | 9.1 | 9.0 | 8.9 |

Table 3 is obtained by measuring the thermal conductivity of the SiAlON composite according to the temperature. The temperature refers to a Celsius temperature ° C. It can be seen that the thermal conductivity of the SiAlON composite tends to decrease as the temperature increases.

More specifically, the thermal conductivity of the SiAlON composite measured at 25° C. may have a value between 9.2 and 11.4, and the thermal conductivity of the SiAlON composites measured at 900° C. may have a value between 8.3 and 9.2.

TABLE 4

| Thermal diffusivity(mm²/sec) | | | | | | | | | | |
|---|---|---|---|---|---|---|---|---|---|---|
| Temperature(° C.) | 25 | 100 | 200 | 300 | 400 | 500 | 600 | 700 | 800 | 900 |
| mm²/sec | 5.12 | 4.34 | 3.68 | 3.28 | 3.00 | 2.79 | 2.65 | 2.56 | 2.50 | 2.48 |

Table 4 is obtained by measuring the thermal diffusivity of the SiAlON composite according to the temperature. The temperature refers to a Celsius temperature ° C. It can be seen that the thermal diffusivity of the SiAlON composite tends to decrease as the temperature increases.

More specifically, the thermal diffusivity of the SiAlON composites measured at 25° C. may have a value between 5.04 and 5.15, and the thermal diffusivity of the SiAlON composites measured at 900° C. may have a value between 2.46 and 2.49.

TABLE 5

| Thermal expansion coefficient($10^{-6}$/K) | |
|---|---|
| Temperature(° C.) | ($10^{-6}$/K) |
| 25 to 1200 | 3.7767 |
| 1200 to 25 | 3.7000 |
| 25 to 1000 | 3.7200 |

The thermal expansion coefficient of the SiAlON composite measured by increasing the temperature from 25° C. (room temperature) to 1200° C. may have a value between 3.52 and 4.0, and the thermal expansion coefficient of the SiAlON composite measured by decreasing the temperature from 1200° C. to 25° C. may have a value between 3.44 and 3.95. Further, the thermal expansion coefficient of the SiAlON composite measured by increasing the temperature from 25° C. (room temperature) to 1000° C. may have a value between 3.43 and 4.01.

Further, the thermal shock resistance temperature of the SiAlON composite of the present disclosure may be about 820° C.

The SiAlON composite according to the embodiment of the present disclosure has suitable thermal conductivity and thermal diffusivity for use as cutting tools for machining of heat resistant super alloys (HRSA).

<Evaluation 3>

An insert which is a cutting tool was made of the SiAlON composite prepared by using raw materials in the above-described ranges of wt %.

The insert made of the SiAlON composite of the present disclosure was compared with the insert made of the SiAlON composite prepared by using a powder mixture obtained by mixing materials of wt % shown in Table 6.

TABLE 6

| Composition of reference tool | | | |
|---|---|---|---|
| Chemical | $Si_3N_4$ | $Al_2O_3$ | $Yb_2O_3$ |
| wt % | 80.500 | 12.2 | 7.3 |

Each insert was tested in milling operation of cutting Inconel 718 at a cutting speed of 740 m/min, a feed per tooth of 0.1 mm/t, a cutting depth of 1.5 mm, cutting width of 20 mm and dry machining.

The number of cycles endured by each insert was recorded until the flank wear depth Vb becomes 0.5 mm.

FIG. 2 shows the milling test results of cutting tools according to the embodiment of the present disclosure.

FIG. 2 is a graph based on the life of an insert (Ret) which is a cutting tool made of the SiAlON composite prepared by using raw materials of Table 6.

The first tested tool life (#1) of the insert which is a cutting tool made of the SiAlON composite according to the present disclosure prepared by using raw materials in the above-described ranges of wt % may be 170% comparing to referenced tool.

Further, the second tested tool life (#2) of the insert which is a cutting tool made of the SiAlON composite according to the present disclosure prepared by using raw materials in the above-described ranges of wt % may be 106% comparing to referenced tool.

As can be seen from the milling test results of FIG. 2, if the SiAlON composite contains both yttrium (Y) and erbium (Er), the life of the cutting tool made of the SiAlON composite can be improved.

Although the exemplary embodiments of the present disclosure have been disclosed for illustrative purposes, those skilled in the art will appreciate that various modifications, additions and substitutions, without departing from the scope and spirit of the disclosure as disclosed in the accompanying claims. Therefore, it should be understood that the above exemplary embodiments are only exemplary, but are not limited. The scope of the present disclosure is represented by the scope of the accompanying claims, rather than the detailed description. All changes or modifications derived from the meaning and scope of the claims and equivalent concepts thereof should be interpreted as being included in the scope of the present disclosure.

The invention claimed is:

1. A SiAlON composite comprising a SiAlON phase including α-SiAlON phase, β-SiAlON phase and grain boundary phase,
   wherein the SiAlON composite is prepared from a starting powder mixture including a silicon nitride powder and at least one powder providing aluminum, oxygen, nitrogen, yttrium (Y) and erbium (Er) to the SiAlON composite,
   wherein the SiAlON composite contains the SiAlON phase of at least 90 vol %, wherein z-value of the β-SiAlON phase ranges between 0.27 and 0.36, wherein a thermal diffusivity of the SiAlON composite is equal to or greater than 2.4 (mm²/sec) and equal to or less than 5.2 (mm²/sec), wherein the starting powder mixture includes alumina ($Al_2O_3$), yttria ($Y_2O_3$) and erbia ($Er_2O_3$), and wherein the sum of contents of the alumina, the yttria and the erbia ranges from 8.87 wt % to 11.83 wt %.

2. The SiAlON composite of claim 1, wherein a thermal conductivity of the SiAlON composite is equal to or greater than 8.2 (W/(m·K)) and equal to or less than 11.4 (W/(m·K)).

3. The SiAlON composite of claim 1, wherein a thermal expansion coefficient of the SiAlON composite is equal to or greater than 3.4 ($10^{-6}$/K) and equal to or less than 4.0 ($10^{-6}$/K).

4. The SiAlON composite of claim 1, wherein a ratio of the α-SiAlON phase to the SiAlON phase is equal to or greater than 21.75% and equal to or less than 48.5%.

5. The SiAlON composite of claim 1, wherein the sum of contents of the yttria and the erbia ranges between 6.08 wt % to 9.12 wt %.

6. The SiAlON composite of claim 1, wherein a Vickers hardness of the SiAlON composite is between 16.6 and 18.7 GPa at room temperature, and a fracture toughness of the SiAlON composite is between 4.1 and 5.4 MPam$^{0.5}$.

7. A metal machining cutting tool, comprising the SiAlON composite according to claim 1.

8. A SiAlON composite comprising a SiAlON phase including α-SiAlON phase, β-SiAlON phase and grain boundary phase, wherein the SiAlON composite contains the SiAlON phase of at least 90 vol %, wherein z-value of the β-SiAlON phase ranges between 0.27 and 0.36, wherein a thermal diffusivity of the SiAlON composite is equal to or greater than 2.4 (mm²/sec) and equal to or less than 5.2 (mm²/sec), wherein a thermal conductivity of the SiAlON composite is equal to or greater than 8.2 (W/(m·K)) and equal to or less than 11.4 (W/(m·K)), a thermal expansion coefficient of the SiAlON composite is equal to or greater than 3.4 ($10^{-6}$/K) and equal to or less than 4.0 ($10^{-6}$/K), wherein the starting powder mixture includes alumina ($Al_2O_3$), yttria ($Y_2O_3$) and erbia ($Er_2O_3$), and wherein the sum of contents of the alumina, the yttria and the erbia ranges from 8.87 wt % to 11.83 wt %.

9. The SiAlON composite of claim 8, wherein a ratio of the α-SiAlON phase to the SiAlON phase is equal to or greater than 21.75% and equal to or less than 48.5%.

10. The SiAlON composite of claim 9, wherein a Vickers hardness of the SiAlON composite is between 16.6 and 18.7 GPa at room temperature, and a fracture toughness of the SiAlON composite is between 4.1 and 5.4 MPam$^{0.5}$.

11. The SiAlON composite of claim 8, wherein
the starting powder mixture includes a silicon nitride powder and at least one powder providing aluminum, oxygen, nitrogen, yttrium (Y) and erbium (Er) to the SiAlON composite.

12. The SiAlON composite of claim 11, wherein the sum of contents of the yttria and the erbia ranges between 6.08 wt % to 9.12 wt %.

13. A SiAlON composite comprising a SiAlON phase including α-SiAlON phase, β-SiAlON phase and grain boundary phase, wherein the SiAlON composite contains the SiAlON phase of at least 90 vol %, wherein the SiAlON composite includes both yttrium (Y) and erbium (Er), wherein z-value of the β-SiAlON phase ranges between 0.27 and 0.36, wherein a thermal diffusivity of the SiAlON composite is equal to or greater than 2.4 (mm²/sec) and equal to or less than 5.2 (mm²/sec), wherein a thermal conductivity of the SiAlON composite is equal to or greater than 8.2 (W/(m·K)) and equal to or less than 11.4 (W/(m·K)), and a thermal expansion coefficient of the SiAlON composite is equal to or greater than 3.4 ($10^{-6}$/K) and equal to or less than 4.0 ($10^{-6}$/K).

14. The SiAlON composite of claim 13, wherein a ratio of the α-SiAlON phase to the SiAlON phase is equal to or greater than 21.75% and equal to or less than 48.5%.

15. The SiAlON composite of claim 14, wherein a Vickers hardness of the SiAlON composite is between 16.6 and 18.7 GPa at room temperature, and a fracture toughness of the SiAlON composite is between 4.1 and 5.4 MPam$^{0.5}$.

* * * * *